United States Patent

Craddock et al.

[15] 3,645,200
[45] Feb. 29, 1972

[54] STOCK CUTTER FOR ELASTOMER DRYING PRESS

[72] Inventors: Wayne Edward Craddock; Stanley George Smith, both of Beaumont, Tex.

[73] Assignee: E. I. du Pont de Nemours and Company, Wilmington, Del.

[22] Filed: Feb. 9, 1970

[21] Appl. No.: 9,587

[52] U.S. Cl. .......................................... 100/98, 18/12, 34/12, 100/148
[51] Int. Cl. ............................................................. B30b 9/00
[58] Field of Search .................... 100/98, 148, 150; 18/12 SR, 18/12 SM, 12 SE; 34/12

[56] References Cited

UNITED STATES PATENTS

| | | | |
|---|---|---|---|
| 3,225,453 | 12/1965 | Burner | 34/12 |
| 3,276,353 | 10/1966 | Burner et al. | 100/148 X |
| 3,276,354 | 10/1966 | Burner | 100/150 |
| 3,285,163 | 11/1966 | Burner | 100/150 |
| 3,382,538 | 5/1968 | Burner | 18/12 |
| 3,518,936 | 7/1970 | Bredeson | 100/148 X |

Primary Examiner—Billy J. Wilhite
Attorney—Louis Del Vecchio

[57] ABSTRACT

In a screw-type drying press for drying elastomeric polymers wherein the elastomer is discharged from the press into a discharge chamber, the elastomer is subdivided into pieces as it leaves the screw press by a stock cutter consisting essentially of (a) a hub rotatably mounted on the axis of the screw press in the discharge chamber immediately adjacent to the exit of the screw press; and (b) at least one blade attached to the outer periphery of the hub positioned at an angle of 1–60° to the rotational axis of the hub with the dependent portion of the blade generally shaped to conform to the shape of the discharge chamber. During rotation the blade subdivides the elastomeric stock, wipes the inside surface of the discharge chamber, and propels the subdivided stock away from the press discharge area. Alternatively, this stock cutter is used in combination with a stationary knife positioned at the exit of the stock cutter particularly when processing elastomeric stocks which have a Mooney viscosity [ML 1+4 (121° C.)] of 10 to 45 when dry.

5 Claims, 3 Drawing Figures

*INVENTORS*
WAYNE EDWARD CRADDOCK
STANLEY GEORGE SMITH

BY *Louis Del Vecchio*

*ATTORNEY*

INVENTORS
WAYNE EDWARD CRADDOCK
STANLEY GEORGE SMITH

BY *Louis Del Vecchio*

ATTORNEY

3,645,200

STOCK CUTTER FOR ELASTOMER DRYING PRESS

BACKGROUND OF THE INVENTION

This invention relates to an improved apparatus for drying natural or synthetic elastomeric stocks. More particularly, it relates to an improved stock cutter positioned at the exit of a screw-type drying press to subdivide the elastomeric stock as it leaves the press.

In preparing elastomers, liquids can become entrained in the elastomer in a number of ways. For example, if the elastomeric polymer is prepared in a solvent, part of the solvent will remain in the isolated polymer. If the polymer is isolated in the form of crumbs, the crumbs are washed with water to remove impurities and part of the water becomes entrained in the polymer. Liquids remaining in the polymer typically include about 2 weight percent solvent and up to 70 weight percent water. The commercially acceptable weight of liquids remaining in an elastomeric polymer is usually about less than 1 percent. Therefore, in preparing commercially acceptable elastomeric polymers, it is necessary to dry the polymer.

It has been found that polymers can be dried effectively if they are dried in two steps. In the first step the polymer is dried to a liquid content of from about 5 to 10 weight percent in a screw-type drying press such as that described in U.S. Pat. No. 3,225,453. This press comprises a screw-type press section wherein the elastomeric material is mechanically kneaded to rupture the pockets in the polymer-containing liquid with means for the escape of this liquid in either the vapor or liquid state through drainage passages in the jacket of the press chamber.

In the second step, the polymer containing about 5 to 10 weight per cent liquid is dried to a residual liquid content of less than 1 weight percent by drying the polymer in a thermal dryer. Preferably, the thermal dryer is the same type drying press used in the first step except that the jacket of the press is heated so that the polymer is both kneaded and heated. Liquids in the polymer are forced out of the polymer by the mechanical action of the screw-type press and the heat in the press vaporizes the liquid.

Polymers leaving the press in the first step have a liquid content of about 5 to 10 weight percent, are very soft and pliable with a consistency comparable to that of taffy, particularly those polymers being manufactured to have a Mooney viscosity [$ML$ 1+4 (121° C.)] of 10 to 45 when dry. The polymer exits the press in long strips and it is warm due to the mechanical action received in the press. The long strips have a tendency to adhere to the exit portions of the press, agglomerate and eventually cause the press to plug. If the strips are successfully discharged from the press they are generally too long to be accepted by the thermal dryer and liquids are sealed into the polymer in such a way that thermal drying is ineffective. It is known that by subdividing this polymer with a stock cutter located at the exit of the drying press used in the first step, that the surface area of polymer greatly increases making thermal drying more effective and that the subdivided polymer is more easily accepted and processed by the thermal drying press.

U.S. Pat. Nos. 3,225,453 and 3,276,354 disclose stock cutters including lugs spaced apart and attached to the stationary discharge cone with at least one lug attached to and rotating with the extruder shaft cooperating with the stationary lugs to tear the polymer as it leaves the extruder. U.S. Pat. No. 3,382,538 discloses an extrusion plate in combination with a truncated conelike structure having mounted on the outside of the cone a series of knives to cut the polymer as it exits the die plate. The cone is independently mounted on the extruder shaft and is rotated in a direction opposite to the rotation of the extruder.

SUMMARY OF THE INVENTION

This invention provides a stock cutter that has the versitility of subdividing (a) elastomeric stocks having a Mooney viscosity [$ML$ 1+4 (121°C.)] of 45 to 70, and (b) the relatively softer elastomeric stocks namely those having a Mooney viscosity [$ML$ 1+4 (121° C.)] of 10 to 45, while simultaneously maintaining a clean press discharge area. The stock cutter is incorporated in a screw-type drying press for drying elastomeric polymers and is positioned at the exit of the screw press in the press discharge to accept polymer being discharged from the press. The stock cutter consisting essentially of (a) a hub in the discharge chamber rotatably mounted on the axis of the screw press immediately adjacent to the exit of the screw press; and (b) at least one planar blade attached to the outer periphery of the hub and having a leading edge, a trailing edge and a dependent edge wherein the plane of the blade is at an angle of 1° to 60° to the rotational axis of the hub, the leading edge of the blade is perpendicular to the rotational axis of the hub and in the plane defined by the end of the hub nearest the press exit, and the dependent edge of the blade generally conforms to the shape of the discharge chamber. During the rotation of the stock cutter the leading edge of the blade subdivides the elastomeric stock as it is discharged from the press, the dependent portion of the blade wipes the inside surface of the discharge chamber and the subdivided stock is propelled away from the discharge chamber by the pitched blade.

Alternatively, this stock cutter can be used in combination with a stationary knife immediately adjacent to the stock cutter exit positioned with the knife, projecting into the stock cutter discharge chamber, the side of the knife parallel to the plane defined by the trailing edge of the blade of the stock cutter as the blade rotates and the cutting edge facing the direction of the oncoming blade during rotation of the blade to further subdivide the elastomeric stock. The combination is particularly useful when subdividing elastomeric stocks which have a Mooney viscosity [$ML$ 1+4 (121° C.)] of 10 to 45 when dry.

DETAILS OF THE INVENTION

Figure 1:
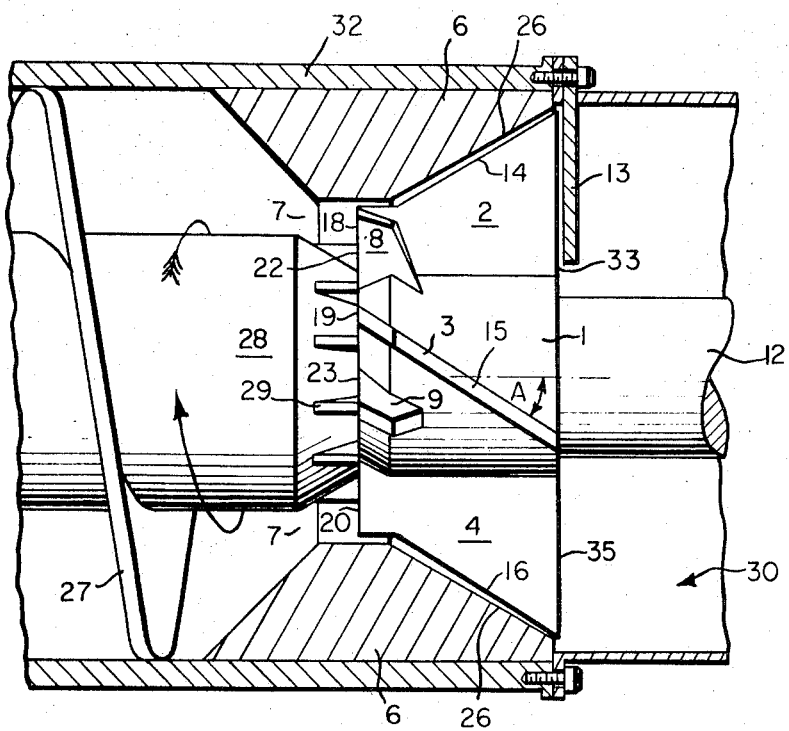
FIG. 1 shows a side view of the preferred stock cutter of this invention mounted at the exit of a dewatering press.
Figure 2:
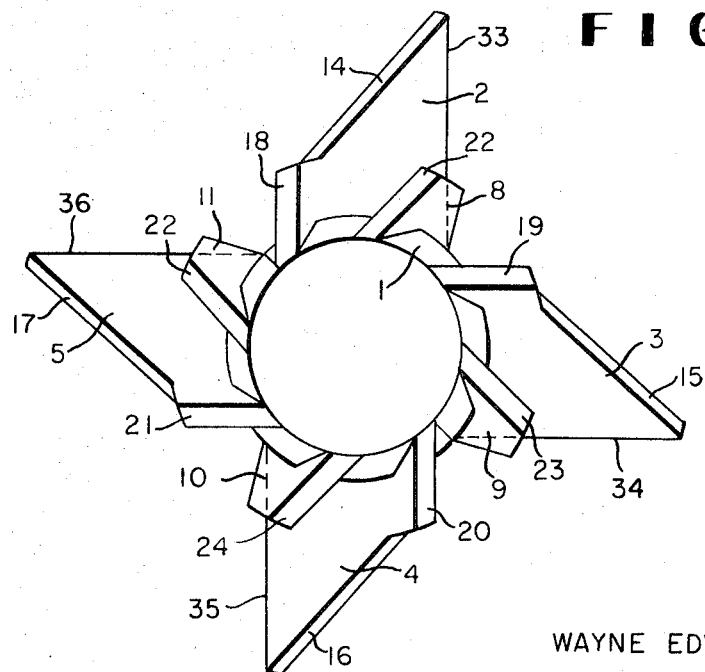
FIG. 2 shows a plan view of the preferred stock cutter of this invention.

Referring to the drawings hub 1 has eight blades fixed to its outer periphery. Four major blades, 2, 3, 4, and 5, are fixed to the outer periphery of hub 1 and are equally spaced circumferentially. These major blades run along the axial length of the hub at a constant pitch which can be fixed at an angle varying from 1° to 60° to the rotational axis of the hub as indicated in FIG. 1 by the angle A. Preferably, the pitch is 25°-40° for optimum efficiency. The dependent portions of the major blades, 14, 15, 16, and 17, are shaped to conform generally to the shape of discharge chamber 6 so that they wipe the inside surface 26 of discharge chamber 6 during rotation of the stock cutter.

The discharge chamber 6 is in the general shape of a truncated cone and is sometimes referred to as the discharge cone. It is mounted to slide in the axial direction to provide a choke or throttling area 7 on the press discharge. The choke provides a means of controlling the residence time in the press and a means of controlling press throughput.

Four minor blades, sometimes referred to as stub blades, 8, 9, 10 and 11, are equally spaced circumferentially between the major blades, have the same constant pitch as the major blades and can be up to 50 percent of the axial length of hub 1. Alternatively, the minor blades can have a pitch different than the pitch of the major blades. In all embodiments the pitch of the major blades is constant and equal and the pitch of the minor blades is also constant and equal.

The leading edges of the major blades 18, 19, 20 and 21, and the leading edges of the minor blades 22, 23, 24 and 25 are the cutting edges. The leading edges of the blades are perpendicular to the rotational axis of the hub and in the plane defined by the end of the hub nearest the press exit. Although it is appreciated that the leading edges of the blades can be set at various angles to the rotational axis it has been found that maximum effectiveness in receiving and subdividing the elastomeric stock is achieved when the leading edges are perpendicular to the rotational axis.

The preferred embodiment is shown with eight blades, four major and four minor blades, however, it is only necessary to have one blade to effect some degree of subdivision. The more blades used the greater the effect. However, each blade fixed to the hub acts as a throttle to the output of the press. Therefore, the number of blades used is a design balance between the desired amount of subdivision and the desired press output.

This stock cutter can be made by conventional methods with metals which are sufficient to withstand the operating conditions of the press. The stock cutter can be cast as one unit or the hub and blades can be cast as separate units and the blades fixed to the hub by welding or bolting the blades to the hub. Suggested metals for use in constructing this stock cutter are cast iron, stainless steel, steel, and brass.

The stock cutter us used in the following manner. The hub has a key way (not shown) in the inside periphery in order to fix the hub to the main screw shaft 12. Although it is preferred that the stock cutter be fixed to the main screw shaft for ease of assembly and operation, it is to be understood that the stock cutter can be independently mounted to rotate at a speed different from the main screw shaft or in a direction opposite to the direction of the main screw shaft. The stock cutter is positioned immediately adjacent to the exit of the screw press with a clearance sufficient to avoid mechanically binding the stock cutter.

The elastomeric stock is kneaded by extruder 27, passes along the outside of extruder shaft 28, through the spacing formed between lugs 29 which are fixed to the end portion of the extruder shaft 28 and into the stock cutter. As the elastomeric stock passes between lugs 29 it is formed into strips and these strips feed directly into the stock cutter.

As the strips enter the stock cutter, i.e., the space between the blades, the stock cutter subdivides the stock by severing it with the leading edges of the rotating blades. The subdivided stock is then propelled away from the drying press through the stock cutter by the pitched blades travelling along the axial length of the blade and into a receiving chamber 30 (shown in part). The dependent portions of the blades during rotation wipe elastomeric stock that collects on the inside surface of discharge cone 6.

Figure 3:
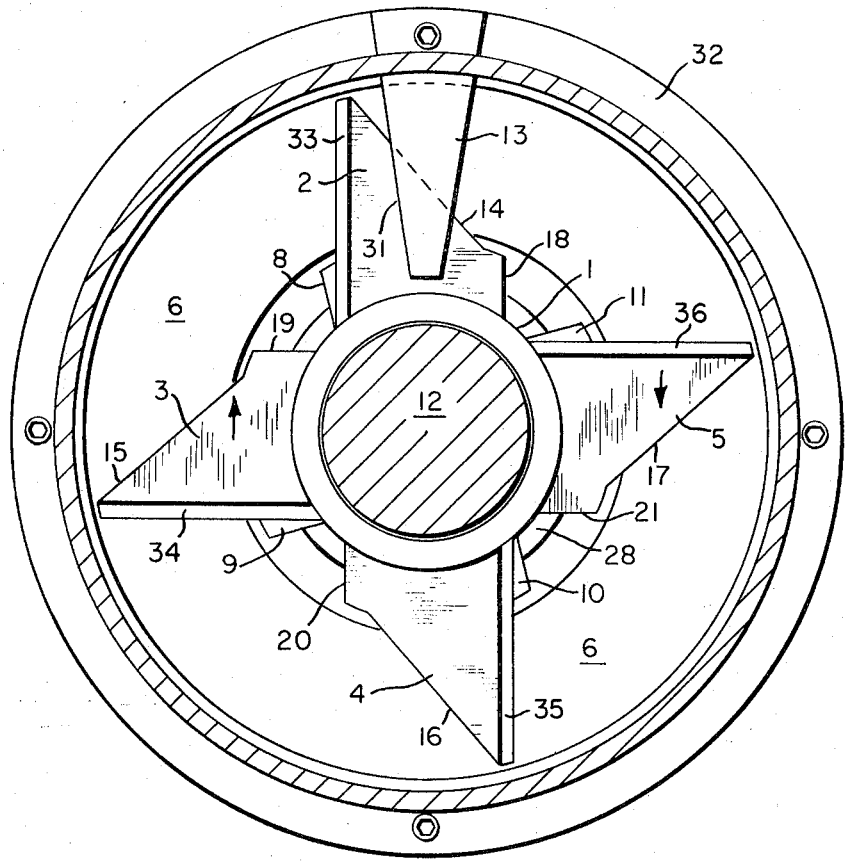
FIG. 3 shows an end view of the preferred stock cutter of this invention in combination with a stationary knife.

In an alternate embodiment shown in FIGS. 1 and 3, this stock cutter can be used in combination with a stationary knife 13. This knife consists essentially of a single blade having the sides in the general shape of a trapezoid and one edge 31 sharpened. The knife is positioned immediately adjacent to the stock cutter exit with a clearance of about 0.5 inch (1.75 cm.) between the knife and the stock cutter blades. The large end of the knife is attached to the stationary extruder housing 32 with the blade portion projecting into the discharge chamber 6 and the broad side of the blade parallel to the plane defined by the trailing edges of the major blades 33, 34, 35 and 36 of the stock cutter as the blades rotate. The sharp edge 31 of stationary blade 13 works against the elastomeric stock exiting the stock cutter. The curvilinear force imparted to the stock by the rotating pitched blades of the stock cutter propels the stock out of the stock cutter and against the sharp edge of the blade which further subdivides the stock as the stock exits the stock cutter. This stationary knife is particularly useful in subdividing elastomeric stocks having a Mooney viscosity ML [1+4 (121°C.)] of 10 to 45 when dry.

The following examples illustrate the use of the stock cutter of this invention. The stock cutter in each example is used in combination with the screw-type drying press described in U.S. Pat. No. 3,225,453 and is keyed into the main shaft of the screw press in the discharge cone of the screw press. Polymers fed into the press have a liquid content up to 70 weight percent of the polymer and exit the press having a liquid content of about 5 to 10 weight percent. These partially dried polymers are then subdivided by the stock cutter of this invention and are fed into a thermal dryer for further drying to commercially acceptable standards. All parts, percentages and proportions are by weight unless otherwise specified.

The viscosities indicated in the examples are obtained by testing the elastomeric stock in a Mooney viscometer. In the viscometer the elastomeric stock is subjected to shearing forces created by a rotor and the greater the resistance of the stock to shear, the higher the Mooney viscosity value. The Mooney viscosity values are preceded by the designation [ML 1+4 (121° C.)] indicating that the Mooney viscosity is obtained by shearing the stock with a large rotor after one minute of preheating followed by four minutes of shearing at 121°C.

EXAMPLE 1

Three copolymers are prepared according to conventional techniques. They are as follows:

Copolymer A is an elastomeric copolymer containing the following monomeric units (weight percent): ethylene, 53; propylene, 44; and 1,4-hexadiene, 3. It is prepared by copolymerizing ethylene, propylene and 1,4-hexadiene in the presence of a catalyst of vanadium oxytrichloride and diisobutyl aluminum monochloride in accordance with general procedures of U.S. Pat. No. 2,933,480. When dried, Copolymer A has a Mooney viscosity [ML 1+4 (120° C.)] of 70 and an inherent viscosity of 3.7 (measured at 30° C. on a solution of 0.1 gram of copolymer in 100 ml. of tetrachloroethylene).

Copolymer B is an elastomeric copolymer containing the following monomeric units (weight percent): ethylene, 52.1; propylene, 44.0; and 1,4-hexadiene, 3.9. It is prepared by polymerizing ethylene, propylene, and 1,4-hexadiene in perchloroethylene in the presence of a coordination catalyst formed by premixing diisobutyl aluminum chloride and vanadium oxytrichloride in accordance with U.S. Pat. No. 2,933,480. The copolymer is subjected to hydrogen modification in accordance with U.S. Pat. No. 3,051,690. The resulting monomer has about 0.33 gram-mole C=C/kg. and a Mooney viscosity [ML 1+4 (121°C.)] of 40.

Copolymer C is the same as Copolymer A except that it is extended with 50 phr. of a hydrocarbon processing oil and has a Mooney viscosity [ML 1+4 (121°C.)] of 30.

These copolymers are separately dried in the drying press of U.S. Pat. No. 3,225,453 disclosed above. The press discharges the copolymers at a pressure that can vary from about 50 to 300 p.s.i.g. and a temperature of approximately 100°C. As the copolymers leave the press they have a liquid content that varies from about 6 to 8 weight percent and are in the form of a strip having a generally rectangular cross section of approximately 1×2 inches (2.5×5 cm.). This strip is fed directly into the stock cutter.

The stock cutter has four one-half inch thick (1.25 cm.) planar blades attached to a hub and pitched at a 30° angle to the rotational axis of the hub. The hub has an axial length of about 6.75 inches (17.2 cm.). This stock cutter is positioned with a one-half inch (1.25 cm.) clearance from the rotating lugs 29 on the discharge end of the extruder and clearances of one-fourth inch (0.6 cm.) to 1½ inches (3.8 cm.) from the discharge cone 6. This clearance varies depending on the positioning of the sliding discharge cone 6. The diameter of the generally shaped truncated imaginary cone scribed by the dependent portions of the rotating blades varies from 9¼ inches (23.5 cm.) next to the press discharge to 18¼ inches (46.4 cm.) conforming generally to the shape of the discharge cone. The stock cutter is keyed to the main shaft of the screw press which operates at approximately 122 revolutions per minute. Stock cutter performance is independent of the production rate through the press and has been found to operate satisfactorily at production rates varying from 2,000 pounds per hour to 7,500 pounds per hour.

Following is Table I showing the maximum size of Copolymers A, B and C after subdivision by the stock cutter.

TABLE I

| Copolymer | Mooney Viscosity [ML 1+4 (121° C.)] | Maximum Size of Subdivided Stock |
| --- | --- | --- |
| A | 70 | ½×1×3 inches (1.25× 2.5×7.5 cm.) |
| B | 40 | ½×1½×4 inches (1.25× 3.8×10 cm.) |
| C | 30 | ½×1½×4 inches (1.25 × 3.8×10 cm.) |

The discharge cone of the press is wiped by the dependent portion of the rotating blades and remains clean. The pitched blades thrust or propel the subdivided polymer away from the discharge area into the receiving chamber and the discharge area remains clean.

When a conventional stock cutter is used it operates satisfactorily when subdividing Copolymer A which has a Mooney viscosity of 70, however, it is unsatisfactory when subdividing Copolymers B and C with Mooney viscosities of 40 and 30, respectively. Copolymers B and C enter the conventional stock cutter, are subdivided but reunite into a mass, adhere to the discharge cone and eventually plug the discharge area.

EXAMPLE 2

The apparatus used in Example 1 is used in combination with a stationary knife located immediately adjacent to the discharge end of the stock cutter. Clearance between the stationary knife and the trailing edges of the stock cutter blades is one-half inch (1.25 cm.). The stationary knife is fixed at one end to the outer periphery of the discharge housing and extends 7½ inches (19 cm.) in length toward the main crew shaft centerline. The broad side of the stationary knife tapers from 4 inches (10 cm.) at the discharge housing perimeter to 1¼ inches (3.2 cm.) at the dependent end. The lower 5½ inches (14 cm.) of the stationary knife are beveled on both the leading and trailing edges to form knife-edged cutting surfaces. The broad side of the knife is parallel to the plane defined by the trailing edges of the major blades as the blades rotate and the cutting edge of the knife faces the direction of the oncoming blades during rotation of the blades.

Two copolymers prepared by conventional techniques are separately dried in the drying press and are separately fed into the combination of stock cutter and stationary knife. The two copolymers are identified as follows:

Copolymer D is prepared by copolymerizing ethylene with propylene and 1,4-hexadiene in solution in tetrachloroethylene in the presence of a coordination catalyst prepared in situ by mixing vanadium tetrachloride with diisobutyl aluminum monochloride in accordance with known procedures (see U.S. Pat. No. 2,933,480); hydrogen modification is employed during the preparation in accordance with U.S. Pat. No. 3,051,690. Copolymer D has a Mooney viscosity of about 45 [ML 1+4 (121° C.)] and contains about 0.33 gr.-mol of ethylenic unsaturation per kilogram of polymer. Copolymer D has the following monomer unit composition by weight: 63 percent ethylene, 33 percent propylene, 4 percent (total) 1,4-hexadiene. The inherent viscosity is about 2.2 measured at 30° C. in a solution of 0.1 gram of copolymer in 100 ml. of tetrachloroethylene.

Copolymer E is a copolymer of ethylene/propylene/1,4-hexadiene (55/42/3 weight percent) prepared in the presence of a diisobutyl aluminum chloride/vanadium tetrachloride catalyst. (See U.S. Pat. No. 2,933,480). The dry copolymer has a Mooney viscosity [ML 1×4 (121° C.)] of 20.

The copolymers in separate operations exit the press containing about 5 to 6 weight percent residual liquids and are fed to the stock cutter in strips having a cross section of about 1×2 inches (2.5×5 cm.).

The effects of subdivision by the stock cutter and the stationary knife are shown in the table below.

TABLE II

| Co-Polymer | Mooney Viscosity [ML 1×4 (121° C.)] | Maximum Size of Subdivided Stock After Stock Cutter | Minimum Size of Subdivided Stock After Stationary Blade |
| --- | --- | --- | --- |
| D | 45 | cross section ½×2 inches (1.25×5 cm.); length 3 to 35 inches (7.5 to 90 cm.) | cross section ½×2 inches (1.25×5 cm.); length 5 inches (12.5 cm.) |
| E | 20 | cross section ½×2 inches (1.25×5 cm.); length 3 to 35 inches (7.5 to 90 cm.) | cross section ½×2 inches (1.5×5 cm.); length 5 inches (12.5 cm.) |

Throughout the operation the discharge area remains clean and the subdivided polymer is propelled away from the discharge area and into the receiving area.

When a conventional stock cutter is used on either copolymer D or E the elastomeric stock is subdivided but it reunites, adheres to the stock cutter and the discharge cone, and eventually plugs the discharge area.

EXAMPLE 3

A copolymer of ethylene/propylene/1,4-hexadiene is prepared in the presence of a diisobutyl aluminum chloride/vanadium oxytrichloride catalyst system having, when dry, a Mooney viscosity [ML 1+4 (121° C.)] of 40 and a monomer unit weight composition of 53 percent ethylene, 44 percent propylene, 3 percent 1,4-hexadiene. This copolymer is passed through the drying press and exits containing 6 percent residual water. It is fed directly to a stock cutter in strips having a rectangular cross section of about 2×1 inches (5×2.5 cm.).

The stock cutter consists essentially of a hub, four major planar blades equally spaced around the circumference and four minor planar blades equally spaced in between the major blades. The axial length of the hub is 7⅜ inches (18.6 cm.).

The four major planar blades are one-half inch (1.25 cm.) thick, run the axial length of the hub, and are pitched at an angle of 30° to the rotational axis. The hub is keyed to the main shaft of the screw press and rotates with the screw press at a rotational speed of 122 revolutions per minute. The maximum size of the imaginary circle scribed by the dependent portions of the major blades during rotation is 9¼ inches (23.3 cm.) near the press exit increasing to 19 inches (48 cm.) at the stock cutter exit with the dependent portion generally conforming to the shape of the discharge cone.

The four minor blades are one-half inch (1.25 cm.) thick, run 2⅜ inches (6 cm.) along the axial length of the hub and are pitched at an angle of 30° to the rotational axis. The dependent portions of the minor blades during rotation scribe an imaginary circle having a diameter of 9¼ inches (23.3 cm.).

The leading edge or cutting edge of each major and minor blade is perpendicular to the rotational axis and in the plane defined by the end of the hub nearest the press exit.

The blades of the stock cutter operate with practically no clearance from lugs 29 on the press discharge and a clearance of about one-eighth inch (0.3 cm.) to 1½ inches (3.75 cm.) from the discharge cone. The clearance between the blades and the discharge cone can vary depending on the positioning of the discharge cone which is adjustable to provide a choking effect on the screw press discharge. The choke aids in controlling the residence time in the press, for example, as the choke is opened the residence time decreases.

This stock cutter is operated in combination with the stationary knife described in Example 2.

The polymer exits the press and is subdivided by the leading edges of the blades of the stock cutter. Due to the pitch in the blades, the blades thrust the polymer away from the discharge area of the press against the stationary knife which further subdivides the stock. The stock then falls into the receiving chamber. The dependent portions of the major blades wipe the discharge cone, the pitched blades keep the polymer moving through the stock cutter and the discharge does not plug.

The subdivided polymer appears as chunks which have various sizes and shapes. The maximum dimensions of the subdivided polymer are no larger than ½×1×4 inches (1.25×2.5×10 cm.).

When a conventional stock cutter is used the polymer subdivides but reunites and adheres to the discharge area eventually plugging the press exit.

What we claim is:

1. In a screw-type drying press for drying elastomeric polymers wherein the elastomer is discharged from the press into a discharge chamber, the elastomer is subdivided when it leaves the screw press and enters the discharge chamber by a stock cutter consisting essentially of (a) a hub in the discharge chamber rotatably mounted on the axis of the screw press immediately adjacent to the exit of the screw press; and (b) at least one planar blade attached to the outer periphery of the hub having a leading edge, a trailing edge and a dependent edge wherein the plane of the blade is pitched at an angle of 1° to 60° to the rotational axis of the hub, the leading edge of the blade is perpendicular to the rotational axis of the hub and in the plane defined by the end of the hub nearest the press exit, and the dependent edge of the blade generally conforms to the shape of the discharge chamber so that during rotation of the stock cutter the leading edge of the blade subdivides the elastomeric stock as it is discharged from the press, the dependent edge of the blade wipes the inside surface of the discharge chamber and the pitched blade propels the subdivided stock away from the press discharge area.

2. The stock cutter of claim 1 in which the blade is attached to the outer periphery of the hub and is pitched at an angle of about 25° to 40° to the rotational axis of the hub.

3. The stock cutter of claim 1 in combination with a stationary knife positioned immediately adjacent to the stock cutter exit and projecting into the stock cutter discharge chamber with the side of the knife parallel to the plane defined by the trailing edge of the blade as the blade rotates and the cutting edge of the knife facing in the direction of the oncoming blade during rotation of the blade to address and further subdivide the elastomeric stock which is propelled by the blades out of the stock cutter into the cutting edge of the knife.

4. The stock cutter of claim 1 in which four major blades are equally spaced circumferentially around the outer periphery of the hub.

5. The stock cutter of claim 4 in which four minor blades are equally spaced between the major blades.

* * * * *